United States Patent [19]

Suzuki

[11] Patent Number: 4,940,366

[45] Date of Patent: Jul. 10, 1990

[54] METHOD OF TREATING BACKFILL

[76] Inventor: Toshiro Suzuki, 1160-12, Morooka-cho, Kohoku-ku, Yokohama-shi, Japan

[21] Appl. No.: 180,106

[22] PCT Filed: Jun. 25, 1987

[86] PCT No.: PCT/JP87/00425

§ 371 Date: Feb. 26, 1988

§ 102(e) Date: Feb. 26, 1988

[87] PCT Pub. No.: WO88/00260

PCT Pub. Date: Jan. 14, 1988

[30] Foreign Application Priority Data

Jul. 1, 1986 [JP] Japan .................. 61-154623

[51] Int. Cl.$^5$ .................................. E02D 3/12
[52] U.S. Cl. .................................. 405/267; 106/900; 405/263; 405/266
[58] Field of Search .............. 405/258, 263, 266, 267; 106/89, 93, 314, 315, 900, 86; 166/288, 292; 264/28

[56] References Cited

U.S. PATENT DOCUMENTS

| | | | |
|---|---|---|---|
| 3,813,460 | 5/1974 | Tardieu | 264/28 |
| 4,019,327 | 4/1977 | Kempster | 405/266 X |
| 4,367,986 | 1/1983 | Miyoshi et al. | 405/266 |

FOREIGN PATENT DOCUMENTS

| | | | |
|---|---|---|---|
| 2205494 | 5/1974 | France . | |
| 51-33662 | 9/1976 | Japan . | |
| 53-5694 | 3/1978 | Japan . | |
| 61-8212 | 3/1986 | Japan . | |
| 238615 | 8/1925 | United Kingdom | 106/86 |

*Primary Examiner*—David H. Corbin
*Attorney, Agent, or Firm*—James H. Tilberry

[57] ABSTRACT

A method is disclosed for preparing excavated soil to render it suitable as hardened backfill by mixing with the soil a cementitious substance and ice particles, the ice particles being used in lieu of the water normally required to react with the cementitious substance.

18 Claims, No Drawings

METHOD OF TREATING BACKFILL

This invention is a method for treating excavated soil with a cementitious substance and ice particles so as to render the soil suitable as backfill which will be at least as stable and as compact as adjacent undisturbed soil, or less stable, if desired.

BACKGROUND

Excavated soil is usually required as backfill around a construction site, and the stability of the backfill is often required to equal or exceed that of the adjacent undisturbed soil. Thus, the soil of a road, runway or the like usually requires greater strength than the adjacent natural soil strength. Conventionally, with respect to these requirements, the stabilization process has been performed as follows. First, the mixture of a cementitious material, such as cement, lime, gypsum, water-glass, or the like, and the excavated soil is backfilled at the excavation site and then the backfill is compacted by rolling, tamping or the like, while solidification of the cementitious material occurs.

In this stabilization process the ratio of the cementitious material to the excavated soil is relatively small, namely less than 10%. Furthermore, in order to maximize the strength of the mixture of soil and cementitious material, it is necessary to use optimum water content. However, there are many grades of soil, some of which are not amenable to homogeneous mixing with a cementitious material and water. Even with soils relatively amenable to mixing, it has been difficult to mix soil homogeneously with a small amount of cementitious material and water.

There are two Japanese Patent Publications (B2) Nos. Sho 51-33662 and Sho 61-8212 which disclose techniques of treating excavated soil. Publication Sho 51-33662 discloses a method of treatment comprising the blending of soil, cement and sludge in a vessel installed at the construction site. As a result of this mixing, the treated soil is alleged to have the desired strength and stability. According to this method, the addition of sludge or the like is done simultaneously with the addition of cement. Publication Sho 61-8212 discloses the method of installing an excavated soil separating unit, a measuring unit and a mixing unit on the excavation site. Soil is excavated and drained of water content by the separating unit. The resultant residue, or mud, is reinforced with a cement homogeneously mixed and then backfilled into the excavation by means of a pressure pump.

However, it has been difficult to mix together the excavated soil, cementitious material and water homogeneously by either method. The strength of the solidified soil is liable to fluctuate because the physical qualities of the soil will vary from one construction site to another. For instance, in soil which contains gravel and rock, separation may occur similar to the phenomenon of separation of aggregate in concrete. Furthermore, it has also been difficult in a case of particularly soft cohesive soil to homogeneously disperse a small amount of water and cementitious material.

Previous to this application, the Applicant invented a method to prepare homogeneous, high quality mortar and concrete in which there is no separation of the aggregate and excellent workability is obtained by using small ice particles in lieu of water and then causing the gradual melting of the ice particles in the stage of mixing the cement and aggregate. (See International Laid-Open patent applications Nos. W086/00884 and W087/00163). In addition, Japanese Patent Publication (B2) No. Sho 53-005694 has disclosed a method of manufacturing construction boards, which comprises the steps of mixing a powdery hydraulic binder with crushed ice in a form like snow at a temperature below the melting point of water substantially in a dry state, compressing the resultant substantially dry mixture to a predetermined thickness and then solidifying the resultant layer at a temperature above the melting point of water. Further, this method has suggested that a porous board is manufactured by adjusting the melting of ice in the stage of solidification.

It is therefore an object of the present invention to produce treated backfill in which ice particles are used in lieu of part or all of the water required for adding to the mixture of excavated soil and cementitious material. The mixture having high homogeneity is effectively produced by making use of characteristics of ice particles in the solid phase or in the quasi-solid phase resulting from the melting of the surfaces thereof, thereby making it possible to treat the excavated soil to provide it with the desired physical properties at low cost.

DESCRIPTION OF THE INVENTION

The invention comprises a method for blending a cementitious material with excavated soil by means of a mixer. The quantity of water necessary to bring the water in the mixture to a predetermined content is added in the form of small ice particles. In the initial stage of mixing, the small ice particles behave as the solid phase or the quasi-solid phase resulting from the partial melting of the small ice particles to carry soil or cementitious components on the ice particle surfaces thereof. A macroscopically homogeneous mixture may be readily obtained through agitation of the soil, cementitious material and small ice particles for a short period of time. Subsequently, the small ice particles are gradually melted and the resultant water wets the surrounding soil or cementitious substance to cause a transition to a homogeneous mixture. This method of soil treatment is not limited to a method of backfilling and compacting the mixture only after obtaining the homogeneous mixture resulting from the melting of the ice particles. The mixture may be backfilled before the ice particles are melted. Thereafter the small ice particles are gradually melted to cause the transition to a homogeneous mixture. By so doing, operating efficiency may be remarkably improved since the mixture may be backfilled in the ground approximately in a dry state, thereby shortening the mixing time.

Since the excavated treated soil may be used to backfill in the excavation it is not necessary to haul the excavated soil to a dumpsite for disposal. Of course the treated excavated soil may be transported for backfill at some other construction excavation site.

If the excavated soil does not contain sufficient moisture, additional make-up water may be mixed with the cementitious material and the small ice particles. However, when the soil is saturated with water, excess water should be separated by a separating unit and then the small ice particles added to the dehydrated soil at the time of mixing and kneading with the cementitious material.

Examples of cementious materials which may be used in the invention are Portland cement, gypsum, lime, water-glass or the like. These cements bind the soil particles to each other to improve the strength of the soil after solidification of the mixture.

The particle size of ice is 30 millimeters or less. When the earth and atmospheric temperatures are high, ice particles having relatively large diameters may be used. On the contrary, when said temperatures are low, ice particles having relatively small diameters may be used. The amount of ice particles to be incorporated is set by subtracting the natural water content contained in the earth from the optimum water content, or, if necessary, by adjusting the amount of water according to the degree of compaction or the like, for example. After the mixture has been backfilled and compacted, proper measures may be taken to prevent the surface from drying, if necessary.

In another embodiment of the invention, the mixture of cementitious material, such as Portland cement, ice particles having relatively large diameters and excavated soil having a high percentage of gravel and rock is backfilled to start solidification. At this time, the ice particles behave as solids, even if the mixture has a high water-cement ratio and the fluidity at the time of backfill is low. Therefore, the space to be backfilled is not compactly filled. With the progress of solidification of the mixture, the ice particles are gradually melted to form cavities. As a result, a coarse solidified composition having low strength may be obtained from the high water-cement ratio mixture.

For example, when the mixture with relatively large diameter ice particles is backfilled into a vertical mine shaft having a depth of several hundred meters, the ice particles are gradually melted to form the solidified composition with cavities resulting from the melting of ice particles. Further, since the ice particles behave as solids, the fluidity of the mixture is low, even if the water-cement ratio is relatively high, and the interior of the shaft, therefore, is not compactly backfilled. However, the solidified backfill has sufficient strength to prevent the shaft from collapsing, and because of its light compaction, the backfill is easily re-excavated.

For light compaction, the ice particles having diameters within the range from 10 to 100 millimeters are preferable. Large diameter ice particles are preferred when the surrounding ambient temperature is high and small diameter ice particles are preferred when the ambient temperature is low. Coarse compacting may be enhanced by adding to the mixture a substance having viscosity-increasing properties, such as methylcellulose. The methylcellulose may be incorporated with the mixture or dissolved in and mixed with the ice particles whereby the coarse mixture will be lightly compacted when backfilled.

A preferred method of designing a proper mixture of soil, cement, water and ice particles includes the following considerations and procedures.

Assuming that the excavated soil has an unconfined compressive strength of 1.0 kg/cm² or less, which must be upgraded to have an unconfined compression strength of about 10.0 kg/cm², the following steps are recommended.

(i) Examine the water content in per cent of dry weight, and the grading distribution and consistency of five samples of excavated soil.

(ii) Mix cement into the five samples of soil in the ratios of 2, 4, 6, 8 and 10%, respectively, and then obtain the optimum water content in per cent of dry weight and the maximum dry density by compaction and penetration tests.

(iii) Conduct unconfined compression tests on each sample at the optimum water content in per cent of dry weight after solidification and then graph the relation between the amount of cement and the strength.

(iv) Determine from the graph the amount of cement required for unconfined compression test strength of 10.0 kg/cm².

When the natural water content in percent of dry weight is very high, the test is conducted on the sample after the natural water content has been separated. Further, in the experimental kneading with small ice particles used in lieu of water, the test may be conducted under conditions closely similar to those of the method according to the present invention.

Generally, the strength of treated soil mixed at the site is less than that mixed in a laboratory by about 20% to 40%. After the correct amount of cement and water content for the mixture has been determined from testing soil samples, the following is a preferred procedure for practicing the invention.

First, the soil is excavated and excess water is separated from the soil. Next the dehydrated soil is transported to a mixing unit where the proper percentages of cement and ice particles are mixed with the soil.

The size of ice particles is properly selected according to the mass of soil to be mixed, the required mixing time and the atmospheric temperature. When the amount of soil is relatively small and the temperature is relatively low, ice particles having diameters of up to several millimeters may be used. Even snow or the like may be used under certain conditions. When the amount of soil is large and the temperature is high, it may be necessary to use ice particles up to 30 millimeters in diameter.

After mixing, the mixture is then removed from the mixing unit and transported to a tank from which the mixture may be pumped back into the excavation. Upon solidification the mixture will acquire strength due to the hydraulic reaction of the cement, water and soil.

It will occur to those skilled in the art, upon reading the foregoing description of the preferred embodiments of the invention, that certain modifications may be made to the invention without departing from its intent or scope. It is intended, therefore, that the invention only be construed and limited by the appended claims.

What is claimed is:

1. The method of preparing soil for back-filling an excavation and backfilling thereof comprising the steps of:
   (a) removing excess water from said soil;
   (b) homogeneously mixing a cementitious material with said soil;
   (c) homogeneously mixing small ice particles with said soil, the temperature of which is above the freezing temperature of water;
   (d) backfilling the homogeneous mixture of soil, cementitious material and small ice particles into an excavation.

2. The method of claim 1, including the step of backfilling said mixture while the ice particles are in the solid state phase.

3. The method of claim 1, including the step of backfilling said mixture while the ice particles are in the quasi-solid state phase.

4. The method of claim 1, including the step of adding to the mixture a substance having viscosity-increasing properties.

5. The method of claim 1, including the step of adding methylcellulose to the mixture in sufficient amount to increase the viscosity of the mixture.

6. The method of claim 1, wherein the ratio of cementitious material to soil is within the range of 2 to 10%.

7. The method of claim 1, wherein sufficient cementitious material is mixed with the soil to yield an unconfined compression strength of substantially 10.0 kg/cm$^2$.

8. The method of preparing soil for backfilling an excavation comprising the steps of:
   (a) adjusting the water content of the soil;
   (b) in a mechanical mixer, at any ambient temperature above freezing, homogeneously mixing soil, a cementitious substance, and solid state ice particles;
   (c) permitting the ice particles to melt sufficiently to at least wet and stick the soil and the cementitious substance to the surfaces of the ice particles;
   (d) removing the mixture of soil, cementitious substance, and ice particles from the mechanical mixer;
   (e) transporting said mixture to an excavation; and
   (f) backfilling said mixture into said excavation.

9. The method of claim 8, wherein the step of adjusting the water content of the soil comprises removing excess water from the soil.

10. The method of claim 8, including the step of mechanically compacting said mixture following backfilling into said excavation.

11. The method of claim 8, including the step of backfilling said mixture while said ice particles are in the solid phase.

12. The method of claim 8, including the step of backfilling said mixture while said ice particles are in the semi-solid phase.

13. The method of claim 8, including the step of backfilling said mixture after said ice particles have been fully melted.

14. The method of claim 8, including the steps to produce a low-strength composition for coarse compaction comprising the steps of:
   (a) selecting a gravel-containing soil;
   (b) selecting ice particles within a range of substantially 10 to 100 millimeters;
   (c) backfilling the said mixture before substantial melting of ice particles occurs;
   (d) lightly compacting the said mixture; and
   (e) permitting the said ice particles to melt to form cavities in the compaction.

15. The method of claim 14, including the step of adding a viscosity-changing substance to said mixture.

16. The method of claim 14, including the step of adding methylcellulose to the said mixture.

17. The method of claim 14, including the step of backfilling said mixture while said ice particles are in the solid phase.

18. The method of claim 14, including the step of backfilling said mixture while said ice particles are in the semi-solid phase.

* * * * *